(12) United States Patent
Bao

(10) Patent No.: US 11,947,499 B2
(45) Date of Patent: Apr. 2, 2024

(54) PEER-TO-PEER GLOBAL NAMESPACE FOR STORAGE SYSTEM METADATA FEDERATIONS

(71) Applicant: EMC IP Holding Company LLC, Hopkinton, MA (US)

(72) Inventor: Qi Bao, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 236 days.

(21) Appl. No.: 16/944,250

(22) Filed: Jul. 31, 2020

(65) Prior Publication Data

US 2022/0035769 A1    Feb. 3, 2022

(51) Int. Cl.
  *G06F 16/178*    (2019.01)
  *G06F 16/16*     (2019.01)

(52) U.S. Cl.
  CPC .......... *G06F 16/178* (2019.01); *G06F 16/164* (2019.01)

(58) Field of Classification Search
  CPC .......................... G06F 16/178; G06F 16/164
  See application file for complete search history.

(56) References Cited

U.S. PATENT DOCUMENTS

| | | | |
|---|---|---|---|
| 2015/0067002 A1* | 3/2015 | Shvachko | G06F 16/1844 707/827 |
| 2016/0162372 A1* | 6/2016 | Whitehead | G06F 3/065 707/654 |
| 2017/0123931 A1* | 5/2017 | Aizman | G06F 11/1448 |
| 2017/0124170 A1* | 5/2017 | Koorapati | G06F 16/27 |
| 2017/0277609 A1* | 9/2017 | Slik | G06F 11/2094 |
| 2019/0236302 A1* | 8/2019 | Czerkowicz | H04L 9/3247 |
| 2019/0238394 A1* | 8/2019 | Watkins | H04L 41/044 |
| 2019/0349733 A1* | 11/2019 | Nolan | H04L 69/22 |
| 2021/0240854 A1* | 8/2021 | Krafcik | G06F 21/6227 |

* cited by examiner

*Primary Examiner* — Albert M Phillips, III
*Assistant Examiner* — Courtney Harmon
(74) *Attorney, Agent, or Firm* — Chamberlain, Hrdlicka, White, Williams & Aughtry; Aly Z. Dossa

(57) ABSTRACT

A peer-to-peer global namespace for storage system metadata federations. Specifically, the disclosure proposes a peer-to-peer metadata federation architecture, where enterprise storage metadata for any and all geo-distributed sites may be distributed across and continually reconciled by a network of nodes, instead of being maintained by a single node assigned to a given geographic location. In implementing a federation, the network of nodes may lack exploitable, centralized points of vulnerability, and therefore, may exhibit no central point of failure. Furthermore, the disclosure proposes the implementation of a global metadata namespace for the enterprise storage metadata spanning the entirety of an enterprise (across all geographic locations). The global metadata namespace may be maintained on each node through event-based synchronization.

20 Claims, 11 Drawing Sheets

PEER-TO-PEER GLOBAL NAMESPACE FOR STORAGE SYSTEM METADATA FEDERATIONS

BACKGROUND

Enterprise datacenters often include nodes functioning as metadata crawlers and databases, through which metadata, pertaining to stored data on one or more assigned enterprise storage clusters residing within a geographic region or space, may be fetched and consolidated. Currently, however, these nodes face both scale-up and scale-out challenges driven by the ever-increasing deployment of storage clusters within each enterprise site and across various geo-distributed locations.

SUMMARY

In general, in one aspect, the invention relates to a method for synchronizing metadata across a plurality of federation member nodes. The method includes detecting, by a first federation member node of the plurality of federation member nodes, a discrepancy between a slave metadata collection maintained on the first federation member node and a master metadata collection maintained on a second federation member node of the plurality of federation member nodes, computing, by the first federation member node and in response to detecting the discrepancy, a local metadata namespace root delta, transmitting, by the first federation member node and to the second federation member node, a namespace update request including the local metadata namespace root delta, receiving, by the first federation member node, from the second federation member node, and in response to the namespace update request, a set of commits applied to the master metadata collection, wherein the set of commits represents the discrepancy between the slave and master metadata collections, and applying, by the first federation member node and to correct the discrepancy, the set of commits to the slave metadata collection.

In general, in one aspect, the invention relates to a non-transitory computer readable medium (CRM). The non-transitory CRM includes computer readable program code, which when executed by a first computer processor of a first federation member node, enables the first computer processor to detect a discrepancy between a slave metadata collection maintained on the first federation member node and a master metadata collection maintained on a second federation member node, compute, in response to detecting the discrepancy, a local metadata namespace root delta, transmit, to the second federation member node, a namespace update request including the local metadata namespace root delta, receive, from the second federation member node and in response to the namespace update request, a set of commits applied to the master metadata collection, wherein the set of commits represents the discrepancy between the slave and master metadata collections, and apply, to correct the discrepancy, the set of commits to the slave metadata collection.

In general, in one aspect, the invention relates to a system. The system includes a plurality of federation member nodes including a first federation member node and a second federation member node, wherein the first federation member node includes a computer processor configured to detect a discrepancy between a slave metadata collection maintained on the first federation member node and a master metadata collection maintained on the second federation member node, compute, in response to detecting the discrepancy, a local metadata namespace root delta, transmit, to the second federation member node, a namespace update request including the local metadata namespace root delta, receive, from the second federation member node and in response to the namespace update request, a set of commits applied to the master metadata collection, wherein the set of commits represents the discrepancy between the slave and master metadata collections, and apply, to correct the discrepancy, the set of commits to the slave metadata collection.

Other aspects of the invention will be apparent from the following description and the appended claims.

DETAILED DESCRIPTION

Figure 1:
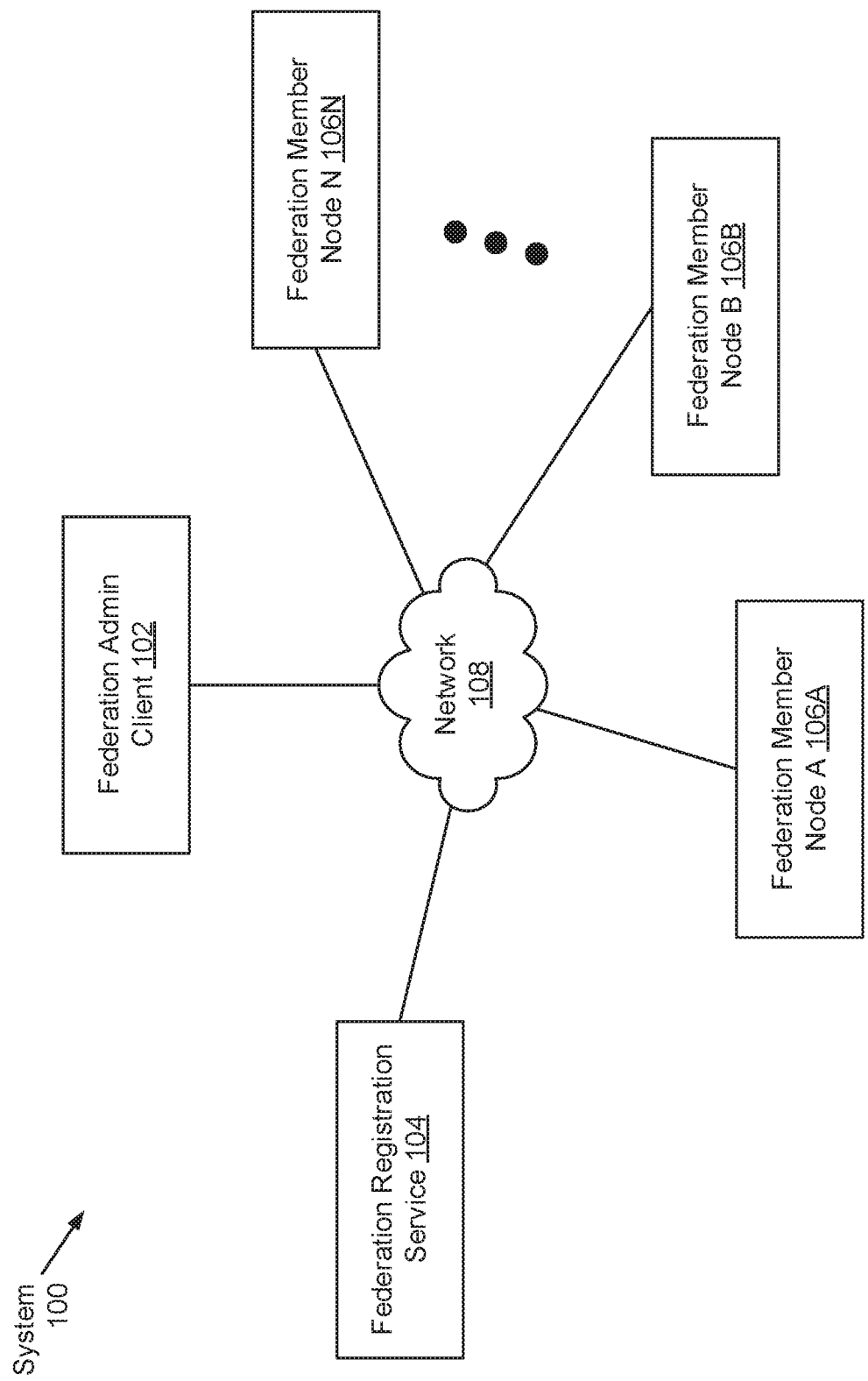
FIG. 1 shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-8, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout the application, the phrase 'operatively connected' may be used to describe a connection between components. As used hereinafter, the aforementioned phrase may refer to any direct (e.g., wired directly between two or more components) or indirect (e.g., wired and/or wireless connections between any number of components connection the operatively connected components) connection.

In general, embodiments of the invention relate to a peer-to-peer global namespace for storage system metadata federations. Specifically, one or more embodiments of the invention propose a peer-to-peer metadata federation architecture, where enterprise storage metadata for any and all geo-distributed sites may be distributed across and continually reconciled by a network of nodes, instead of being maintained by a single node assigned to a given geographic location. In implementing a federation, the network of nodes may lack exploitable, centralized points of vulnerability, and therefore, may exhibit no central point of failure. Furthermore, one or more embodiments of the invention propose the implementation of a global metadata namespace for the enterprise storage metadata spanning the entirety of an enterprise (across all geographic locations). The global metadata namespace may be maintained on each node through event-based synchronization.

FIG. 1 shows a system in accordance with one or more embodiments of the invention. The system (100) may include a federation admin client (102), a federation registration service (104), and multiple federation member nodes (106A-106N). Each of these system (100) components is described below.

In one embodiment of the invention, the above-mentioned system (100) components may communicate with one another through a network (108) (e.g., a local area network (LAN), a wide area network (WAN) such as the Internet, a mobile network, any other network type, or a combination thereof). The network (108) may be implemented using any combination of wired and/or wireless connections. Further, the network (108) may encompass various interconnected, network-enabled devices (or systems) (e.g., switches, routers, gateways, etc.) that may facilitate communications between the above-mentioned system (100) components. Moreover, in communicating with one another, the above-mentioned system (100) components may employ any combination of wired and/or wireless communication protocols.

In one embodiment of the invention, the federation admin client (102) may represent any physical appliance or computing system operated by one or more administrators of the system (100). An administrator may refer to an individual or entity whom may be responsible for overseeing system (100) operations and maintenance. To that extent, the federation admin client (102) may include functionality to: establish a connection with the federation registration service (104) or any of the multiple federation member nodes (106A-106N) at the behest of an administrator; following the establishment of a connection, enable an administrator to sign-in or login into the federation registration service (104) or any of the multiple federation member nodes (106A-106N); and facilitate the deliverance (e.g., via an interface) of administrator commands to the federation registration service (104) or any of the multiple federation member nodes (106A-106N).

By way of an example, an administrator, via the federation admin client (102), may connect and login to the federation registration service (104) to generate and store a shared secret thereon, which may be used by the federation registration service (104) in the certification process of a new federation member node (not shown). By way of another example, an administrator, via the federation admin client (102), may connect and login to the new federation member node to store the same aforementioned shared secret (generated on the federation registration service (104)) thereon, which may be used by the new federation member node in the certification process thereof. The certification process, through which a digital identity certificate may be granted to a new federation member node, is outside the scope of, and therefore, will not be detailed in, the instant disclosure. Furthermore, one of ordinary skill will appreciate that the federation admin client (102) may perform other functionalities without departing from the scope of the invention. Examples of the federation admin client (102) may include, but are not limited to, a desktop computer, a laptop computer, a tablet computer, a workstation computer, a server, a mainframe, a smartphone, or any other computing system similar to the exemplary computing system shown in FIG. 8.

In one embodiment of the invention, the federation registration service (104) may represent information technology (IT) infrastructure configured for new federation member node authentication. More specifically, the federation registration service (104) may be responsible for authenticating new federation member node identity and, subsequently, for providing any new federation member node with a digital identity certificate, which may be used during a federation joining protocol performed between the new federation member node and the multiple, existing federation member nodes (106A-106N). The aforementioned federation joining protocol, through which a new federation member node may be accepted into the federation of federation member nodes (106A-106N), is outside the scope of, and therefore, will not be detailed in, the instant disclosure. One of ordinary skill will appreciate that the federation registration service (104) may perform other functionalities without departing from the scope of the invention.

In one embodiment of the invention, the federation registration service (104) may be implemented using one or more servers (not shown). Each server may represent a physical or virtual server, which may reside in an enterprise datacenter or a cloud computing environment. Additionally or alternatively, the federation registration service (104) may be implemented using one or more computing systems similar to the exemplary computing system shown in FIG. 8. The federation registration service (104) is described in further detail in FIG. 2, below.

In one embodiment of the invention, a federation member node (106A-106N) may represent any physical appliance or computing system configured to, at least in part, implement a geo-distributed federation (described below) for maintaining metadata describing data pertinent to the entirety of an enterprise. To that extent, a federation member node (106A-106N) may include functionality to: crawl various data stores or storage systems (not shown) within a defined or assigned geographic area (e.g., neighborhood, city, region, country, etc.) for metadata (e.g., creation date, author, data or file type, data or file size, version number, etc.) descriptive of the data stored on those various data stores or storage systems; consolidate the crawled metadata as a master metadata collection thereon; maintain a slave metadata collection for, which may include metadata descriptive of enterprise data residing within another defined geographic area assigned to and crawled by, each other federation member node (106A-106N); synchronize (or exchange metadata updates or commits) with the various other federation member nodes (106A-106N) to establish consistency among the overall enterprise metadata across the geo-distributed federation; maintain a local metadata namespace (see e.g., FIG. 4A) for each of the master metadata collection and the various slave metadata collections stored thereon, where a local metadata namespace may be used to verify or discover changes applied to a respective metadata collection; and maintain a global metadata namespace (see e.g., FIG. 4B) for all (master and various slave) metadata collections stored thereon, where the global metadata namespace may be used to verify or discover changes applied to all metadata collections as a whole. One of ordinary skill will appreciate that a federation member node (106A-106N) may perform other functionalities without departing from the scope of the invention. Federation member nodes (106A-106N) are described in further detail in FIG. 3, below.

In one embodiment of the invention, a federation may refer to a network of computing systems collectively configured to facilitate the interconnection of two or more disparate, independent network domains. With respect to enterprise metadata management, the federation member nodes (106A-106N) may form a federated database system, where various metadata collections may be maintained and accessed under a single global namespace. Further, the federation of the federation member nodes (106A-106N) may function as a decentralized peer-to-peer (p2p) network. In a decentralized p2p network, information (e.g., enterprise-wide metadata) may be distributed across and continually reconciled by various computing systems (e.g., federation member nodes (106A-106N)), instead of being maintained by a central authority. Subsequently, a decentralized p2p network may lack centralized points of vulnerability, which may be exploited, and therefore, exhibits no central point of failure.

While FIG. 1 shows a configuration of components, other system (100) configurations may be used without departing from the scope of the invention. For example, the system (100) may further include a different set of one or more storage clusters (not shown) assigned and operatively connected to each federation member node (106A-106N), wherefrom the master metadata collection consolidated on the given federation member node (106A-106N) may be sourced from data maintained on the assigned storage cluster(s).

Figure 2:
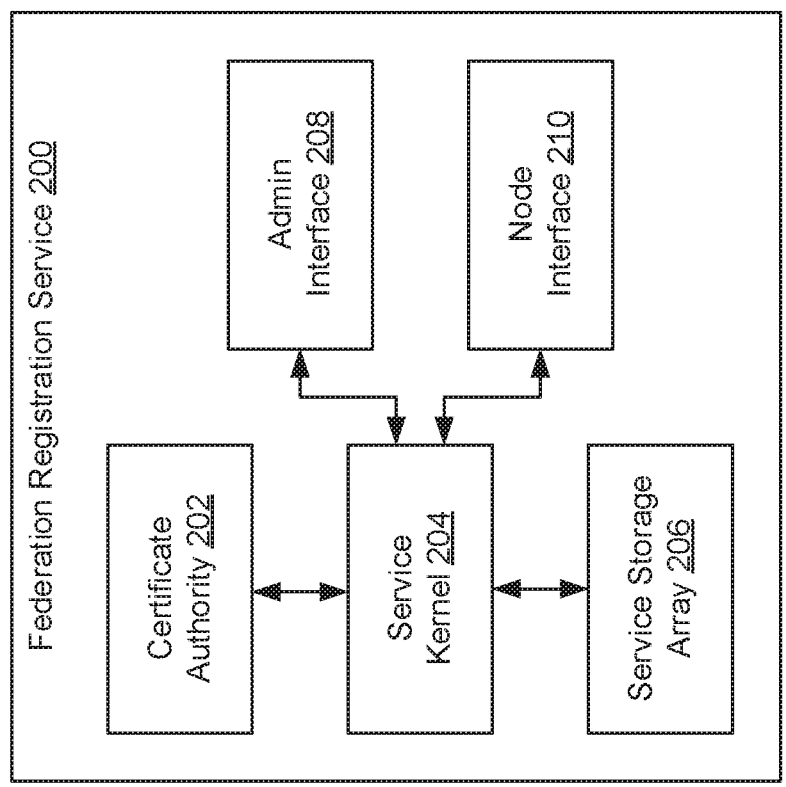
FIG. 2 shows a federation registration service in accordance with one or more embodiments of the invention.

FIG. 2 shows a federation registration service in accordance with one or more embodiments of the invention. The federation registration service (200) may include a certificate authority (202), a service kernel (204), a service storage array (206), an admin interface (208), and a node interface (210). Each of these federation registration service (200) subcomponents is described below.

In one embodiment of the invention, the certificate authority (202) may refer to a computer program that executes on the underlying hardware of the federation registration service (200), which may be responsible for issuing digital identity certificates to new federation member nodes (not shown). A digital identity certificate may refer to an electronic document with which the identity of a given federation member node may be authenticated, and with which other federation member nodes may establish trust with the given federation member node. To that extent, the certificate authority (202) may include functionality to: receive and process certificate signing requests from new federation member nodes, which may or may not lead to the issuance of digital identity certificates to the new federation member nodes. Issuance of a digital identity certificate may be contingent on the validity of the node identifying information enclosed within the certificate signing request, as well as the authenticity of the node digital signature attached therewith. One of ordinary skill will appreciate that the certificate authority (202) may perform other functionalities without departing from the scope of the invention.

In one embodiment of the invention, the service kernel (204) may refer to a physical controller (e.g., computer processor including integrated circuitry designed for processing computer instructions) on the federation registration service (200), a computer program (e.g., operating system) executing on the underlying hardware of the federation registration service (200), or a combination thereof, which may be responsible for overseeing federation registration service (200) operations. To that extent, the service kernel (204) may include functionality to, for example, support fundamental federation registration service (200) functions; schedule tasks; mediate interactivity between logical (e.g., software) and physical (e.g., hardware) federation registration service (200) subcomponents; and allocate federation registration service (200) resources (e.g., computer processors, memory, storage, virtualization, networking, etc.) as needed. One of ordinary skill will appreciate that the service kernel (204) may perform other functionalities without departing from the scope of the invention.

In one embodiment of the invention, the service storage array (206) may refer to a collection of one or more physical storage devices (not shown) on which various forms of information may be consolidated. The information that may be stored in the service storage array (206) may include, but is not limited to, shared secrets between the federation registration service (200) and the federation member nodes (not shown), respectively; database records maintaining node identifying (and other pertinent) information for the federation member nodes; and digital identity certificates generated and issued to the federation member nodes. Each physical storage device may encompass non-transitory computer readable storage media on which data may be stored in whole or in part, and temporarily or permanently. Further, each physical storage device may be implemented based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the service storage array (206) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the admin interface (208) may refer to networking hardware (e.g., network card or adapter), a logical interface (e.g., graphical user or command line interface), an interactivity protocol (e.g., application programming interface), or any combination thereof, which may be responsible for facilitating communications between the federation registration service (200) and a federation admin client (see e.g., FIG. 1), which may be operated by a federation administrator. To that extent, the admin interface (208) may include functionality to enable federation administrator interactivity with the federation registration service (200). By way of an example, a federation administrator, via a federation admin client and the admin interface (208), may connect and login to the federation registration service (200) to generate and store a shared secret thereon, which may be used by the federation registration service (200) in the certification process of a new federation member node. One of ordinary skill will appreciate that the admin interface (208) may perform other functionalities without departing from the scope of the invention.

In one embodiment of the invention, the node interface (210) may refer to networking hardware (e.g., network card or adapter), a logical interface (e.g., graphical user or command line interface), an interactivity protocol (e.g., application programming interface), or any combination thereof, which may be responsible for facilitating communications between the federation registration service (200) and each of various federation member nodes (not shown). To that extent, the node interface (210) may include functionality to enable new federation member node interactivity with the federation registration service (200). By way of an example, a new federation member node, via the node interface (210), may submit a certificate signing request, alongside a message authentication code (MAC) derived from a shared secret, to the federation registration service (200), which may be used by the federation registration service (200) in the certification process of the new federation member node. One of ordinary skill will appreciate that the node interface (210) may perform other functionalities without departing from the scope of the invention.

While FIG. 2 shows a configuration of subcomponents, other federation registration service (200) configurations may be used without departing from the scope of the invention.

Figure 3:
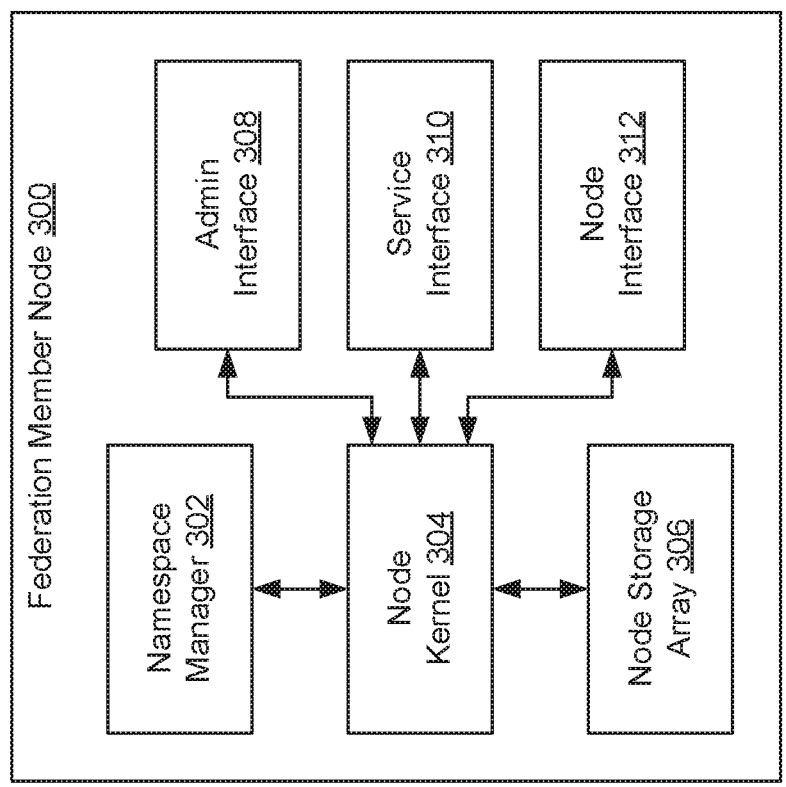
FIG. 3 shows a federation member node in accordance with one or more embodiments of the invention.

FIG. 3 shows a federation member node in accordance with one or more embodiments of the invention. The federation member node (300) may include a namespace manager (302), a node kernel (304), a node storage array (306), an admin interface (308), a service interface (310), and a node interface (312). Each of these federation member node (300) subcomponents is described below.

In one embodiment of the invention, the namespace manager (302) may refer to a computer program that executes on the underlying hardware of the federation member node (300), which may be responsible for local and global metadata namespace (described below) (see e.g., FIGS. 4A and 4B) management thereon. To that extent, the namespace manager (302) may include functionality to: generate (and update) a local metadata namespace for each metadata collection (master or slave) consolidated on the node storage array (306) (described below); and generate (and update) a global metadata namespace for all metadata collections (master and various slaves) on the node storage array (306). Further, because any metadata namespace (local or global) represents a hash-based data structure, the namespace manager (302) may include functionality to employ one or more existing cryptographic hash functions (e.g., Secure Hash Algorithm (SHA)-256). Moreover, one of ordinary skill will appreciate that the namespace manager (302) may perform other functionalities without departing from the scope of the invention.

In one embodiment of the invention, the node kernel (304) may refer to a physical controller (e.g., computer processor including integrated circuitry designed for processing computer instructions) on the federation member node (300), a computer program (e.g., operating system) executing on the underlying hardware of the federation member node (300), or a combination thereof, which may be responsible for overseeing federation member node (300) operations. To that extent, the node kernel (304) may include functionality to, for example, support fundamental federation member node (300) functions; schedule tasks; mediate interactivity between logical (e.g., software) and physical (e.g., hardware) federation member node (300) subcomponents; and allocate federation member node (300) resources (e.g., computer processors, memory, storage, virtualization, networking, etc.) as needed. One of ordinary skill will appreciate that the node kernel (304) may perform other functionalities without departing from the scope of the invention.

In one embodiment of the invention, the node storage array (306) may refer to a collection of one or more physical storage devices (not shown) on which various forms of information may be consolidated. The information that may be stored in the node storage array (306) may include, but is not limited to, a shared secret between the federation member node (300) and the federation registration service (not shown); a digital identity certificate issued to the federation member node (300) by the federation registration service; a master metadata collection, including metadata obtained through periodic crawling operations performed on one or more enterprise data stores or storage systems (not shown) assigned and operatively connected to the federation member node (300); various slave metadata collections—each including metadata obtained through periodic crawling operations performed on one or more other (remote) enterprise data stores or storage systems (not shown) assigned and operatively connected to another (remote) federation member node (not shown); a metadata changes log for each metadata collection, where the metadata changes log for a given metadata collection tracks the updates (or changes) in metadata belonging to the given metadata collection; various local metadata namespaces (see e.g., FIG. 4A) used to verify or discover changes in the various (master and slave) metadata collections, respectively; and a global metadata namespace (see e.g., FIG. 4B) used to verify or discover changes across the entirety of the various metadata collections stored thereon.

In one embodiment of the invention, each physical storage device (not shown) may encompass non-transitory computer readable storage media on which data may be stored in whole or in part, and temporarily or permanently. Further, each physical storage device may be implemented based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the node storage array (306) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST- MRAM), Phase Change Memory (PCM), or any other storage defined as non-volatile Storage Class Memory (SCM).

In one embodiment of the invention, the admin interface (308) may refer to networking hardware (e.g., network card or adapter), a logical interface (e.g., graphical user or command line interface), an interactivity protocol (e.g., application programming interface), or any combination thereof, which may be responsible for facilitating communications between the federation member node (300) and a federation admin client (see e.g., FIG. 1), which may be operated by a federation administrator. To that extent, the admin interface (308) may include functionality to enable federation administrator interactivity with the federation member node (300). By way of an example, a federation administrator, via a federation admin client and the admin interface (308), may connect and login to the federation member node (300), prior to the federation member node (300) joining the federation of federation member nodes (see e.g., FIG. 1), to store a shared secret thereon, which may be used by the federation member node (300) in the certification process thereof. One of ordinary skill will appreciate that the admin interface (308) may perform other functionalities without departing from the scope of the invention.

In one embodiment of the invention, the service interface (310) may refer to networking hardware (e.g., network card or adapter), a logical interface (e.g., graphical user or command line interface), an interactivity protocol (e.g., application programming interface), or any combination thereof, which may be responsible for facilitating communications between the federation member node (300) and the federation registration service (not shown) (see e.g., FIG. 1). To that extent, the service interface (310) may include functionality to enable federation member node (300) interactivity with the federation registration service, and vice versa. By way of an example, the federation member node (300), via the service interface (310), may submit a certificate signing request, alongside a message authentication code (MAC) derived from a shared secret, to the federation registration service, which may be used by the federation registration service in the certification process of the federation member node (300). In turn, by way of another example, the federation member node (300), via the service interface (310), may receive a digital identity certificate issued from the federation registration service in response to the aforementioned certification signing request submission. One of ordinary skill will appreciate that the service interface (310) may perform other functionalities without departing from the scope of the invention.

In one embodiment of the invention, the node interface (312) may refer to networking hardware (e.g., network card or adapter), a logical interface (e.g., graphical user or command line interface), an interactivity protocol (e.g., application programming interface), or any combination thereof, which may be responsible for facilitating communications between the federation member node (300) and each of various other (remote) federation member nodes (not shown). To that extent, the node interface (312) may include functionality to enable federation member node (300) interactivity with any other (remote) federation member node, and vice versa. By way of an example, the federation member node (300), via the node interface (312), may participate in a federation heartbeat protocol (see e.g., FIG. 5), a metadata namespace push update protocol (see e.g., FIGS. 6A and 6B), and a metadata namespace pull update protocol (see e.g., FIGS. 7A and 7B) with the various other (remote) federation member nodes. One of ordinary skill will appreciate that the node interface (312) may perform other functionalities without departing from the scope of the invention.

While FIG. 3 shows a configuration of subcomponents, other federation member node (300) configurations may be used without departing from the scope of the invention. For example, the federation member node (300) may further include a metadata crawler (not shown) and a data cluster interface (not shown). In one embodiment of the invention, the metadata crawler may refer to a computer program that executes on the underlying hardware of the federation member node (300), which may be responsible for fetching metadata from, where the fetched metadata may be descriptive of enterprise data stored on, one or more storage clusters (i.e., data stores and/or storage systems) assigned to the federation member node (300). The data cluster interface, accordingly, may refer to networking hardware (e.g., network card or adapter), a logical interface (e.g., graphical user or command line interface), an interactivity protocol (e.g., application programming interface), or any combination thereof, which may be responsible for facilitating metadata crawling (or fetching) between the federation member node (300) and the one or more storage clusters.

Figure 4A:
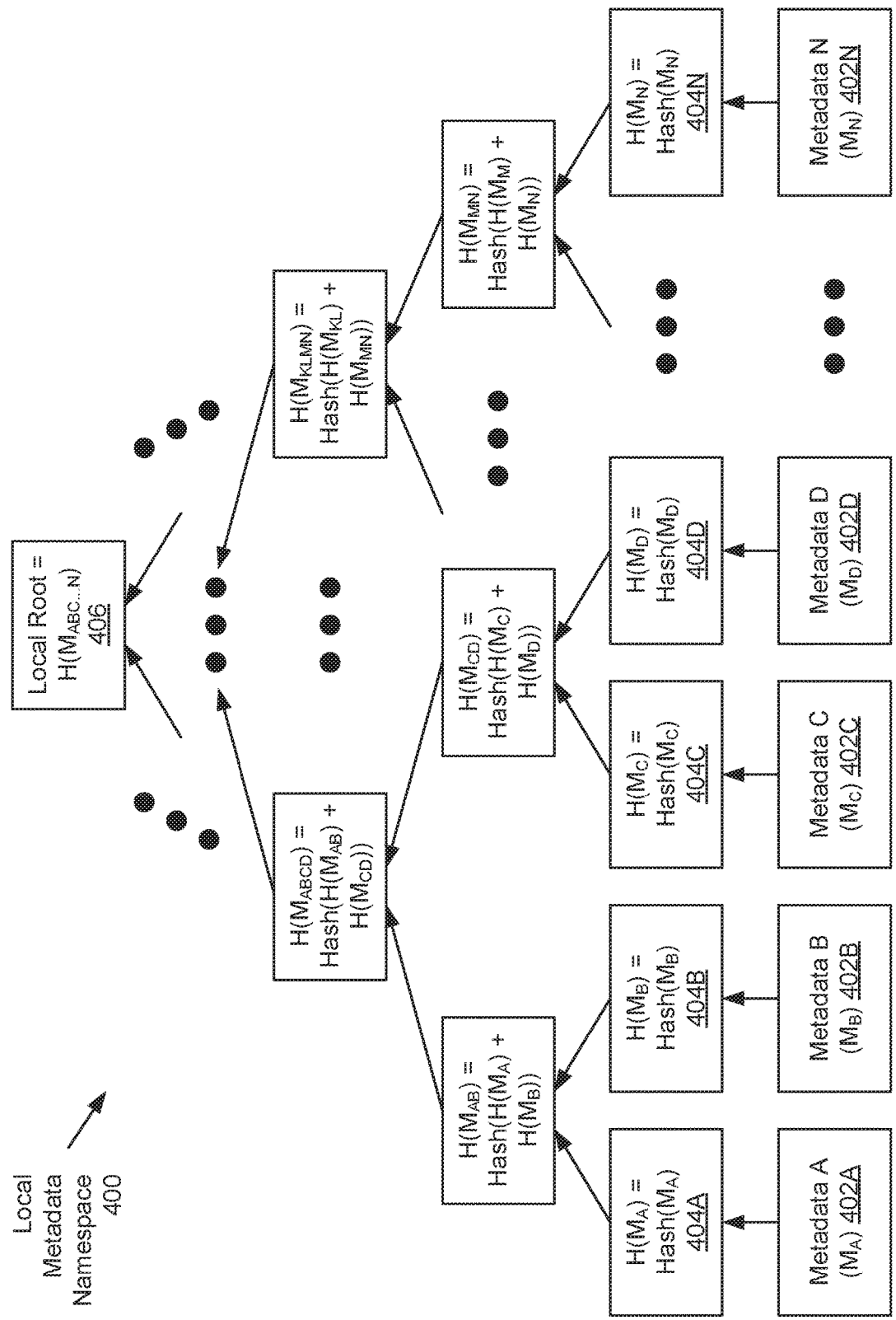
FIG. 4A shows a local metadata namespace in accordance with one or more embodiments of the invention.

FIG. 4A shows a local metadata namespace in accordance with one or more embodiments of the invention. As mentioned above (see e.g., FIG. 3), a federation member node may maintain various local metadata namespaces (400) thereon—each of which may relate to the master metadata collection, or one of the many slave metadata collections, stored on the federation member node. Further, any local metadata namespace (400) may serve as an efficient and secure mechanism for verifying (or otherwise authenticating) the contents of potentially large datasets such as, for example, a metadata collection from which the given local metadata namespace (400) may be derived. Through the implementation of a local metadata namespace (400), changes between versions of the local metadata namespace (400) may easily and rapidly be discovered, where the changes may be brought about by the application (or missed-application) of one or more commits, representing additions, deletions, and/or modifications, to a metadata collection.

In one embodiment of the invention, the architecture of a local metadata namespace (400) may resemble that of an arbitrary n-ary hash tree. A non-limiting example of a local metadata namespace (400) as a binary hash tree, also known as a Merkle tree, is portrayed herein. As the exemplary binary hash tree, a local metadata namespace (400) may represent a hash-based data structure in which each node thereof may exhibit at most two children. Further, each node may be representative of a cryptographic hash (i.e., alphanumeric character string) of either a piece of metadata (e.g., $M_A$ (402A), $M_B$ (402B), $M_C$ (402C), . . . , $M_N$ (402N)) of the metadata collection from which the local metadata namespace (400) may be derived (e.g., leaf nodes $H(M_A)$ (404A), $H(M_B)$ (404B), $H(M_C)$ (404C), . . . , $H(M_N)$ (404N)) or a concatenation of its child nodes (e.g., non-leaf nodes $H(M_{AB})$, $H(M_{CD})$, . . . , $H(M_{MN})$). The topmost node (i.e., $H(M_{ABC...N})$ (406)) in the local metadata namespace (400), which may also be referred to as a local metadata namespace root, may represent the aggregated cryptographic hash for all pieces of metadata specified in the metadata collection.

Figure 4B:
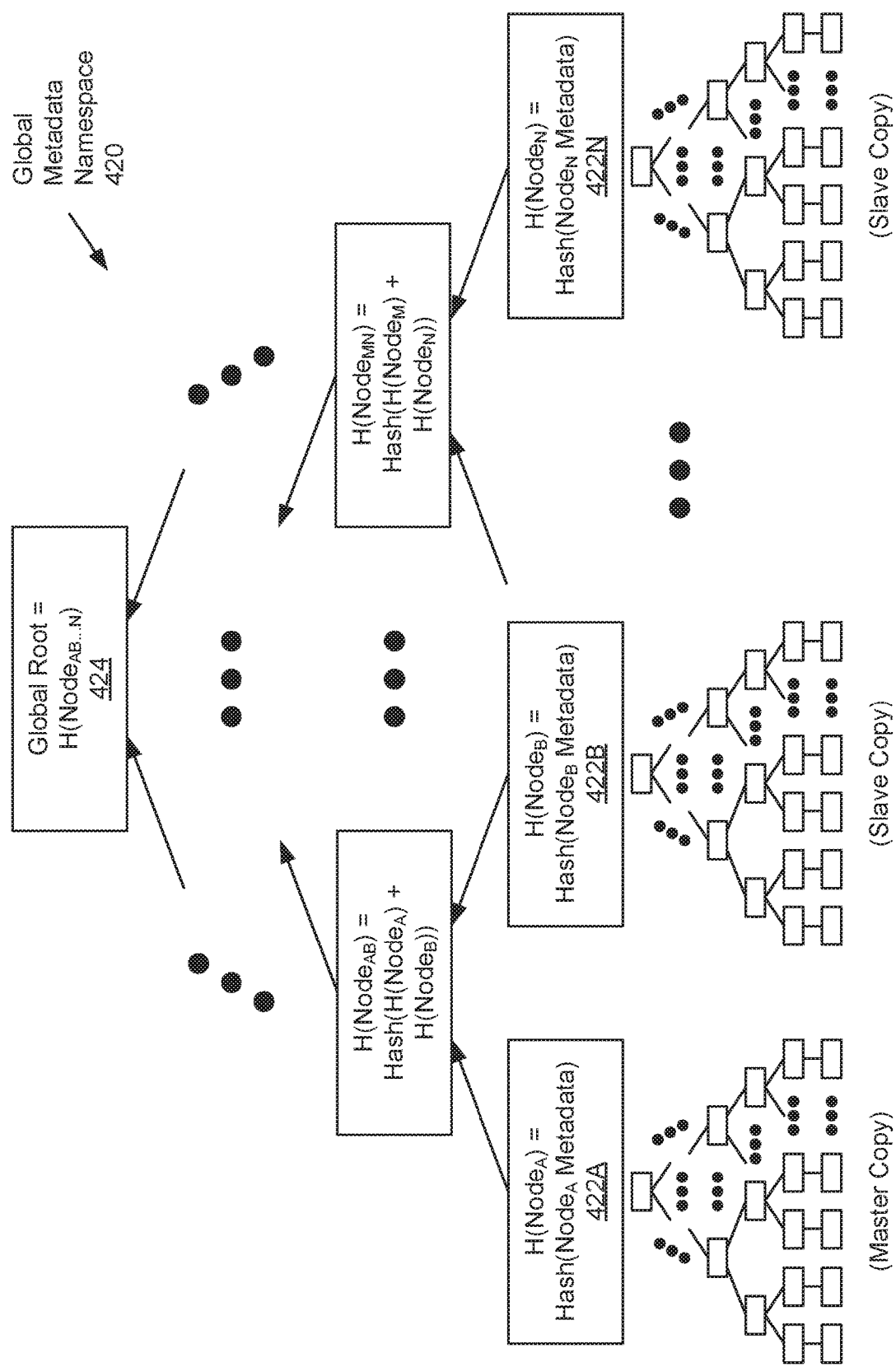
FIG. 4B shows a global metadata namespace in accordance with one or more embodiments of the invention.

FIG. 4B shows a global metadata namespace in accordance with one or more embodiments of the invention. As mentioned above (see e.g., FIG. 3), a federation member node may maintain a single global metadata namespace (420) thereon, which may be used to verify (or otherwise authenticate) the contents across all (master and various slave) metadata collections stored on the federation member node. Through the implementation of the global metadata namespace (420), changes between versions of the global metadata namespace (420) may easily and rapidly be discovered, where the changes may be brought about by the application (or missed-application) of one or more commits, representing additions, deletions, and/or modifications, to any subset or all metadata collections thereon.

In one embodiment of the invention, the architecture of the global metadata namespace (420) may resemble that of an arbitrary n-ary hash tree. A non-limiting example of a global metadata namespace (420) as a binary hash tree, also known as a Merkle tree, is portrayed herein. As the exemplary binary hash tree, the global metadata namespace (420) may represent a hash-based data structure in which each node thereof may exhibit at most two children. Further, each leaf node (e.g., H(Node$_A$) (422A), H(Node$_B$) (422B), . . . , H(Node$_N$) (422N)) may represent an aggregated cryptographic hash (i.e., alphanumeric character string) for all pieces of metadata specified in a different metadata collection (master or slave) stored on a federation member node. That is, each leaf node (422A-422N) may reflect the local metadata namespace root (see e.g., FIG. 4A) for a respective local metadata namespace derived from one of the various (master or slave) metadata collections on the federation member node. Each non-leaf node (e.g., H(Node$_{AB}$), . . . , H(Node$_{MN}$)) there-above (including the topmost node (i.e., H(Node$_{ABC \ldots N}$) (424))) may be representative of a cryptographic hash (i.e., alphanumeric character string) of a concatenation of its child nodes. Moreover, the topmost node (424), which may also be referred to as the global metadata namespace root, may represent the aggregated cryptographic hash for all pieces of metadata specified across all metadata collections on the federation member node.

Figure 5:
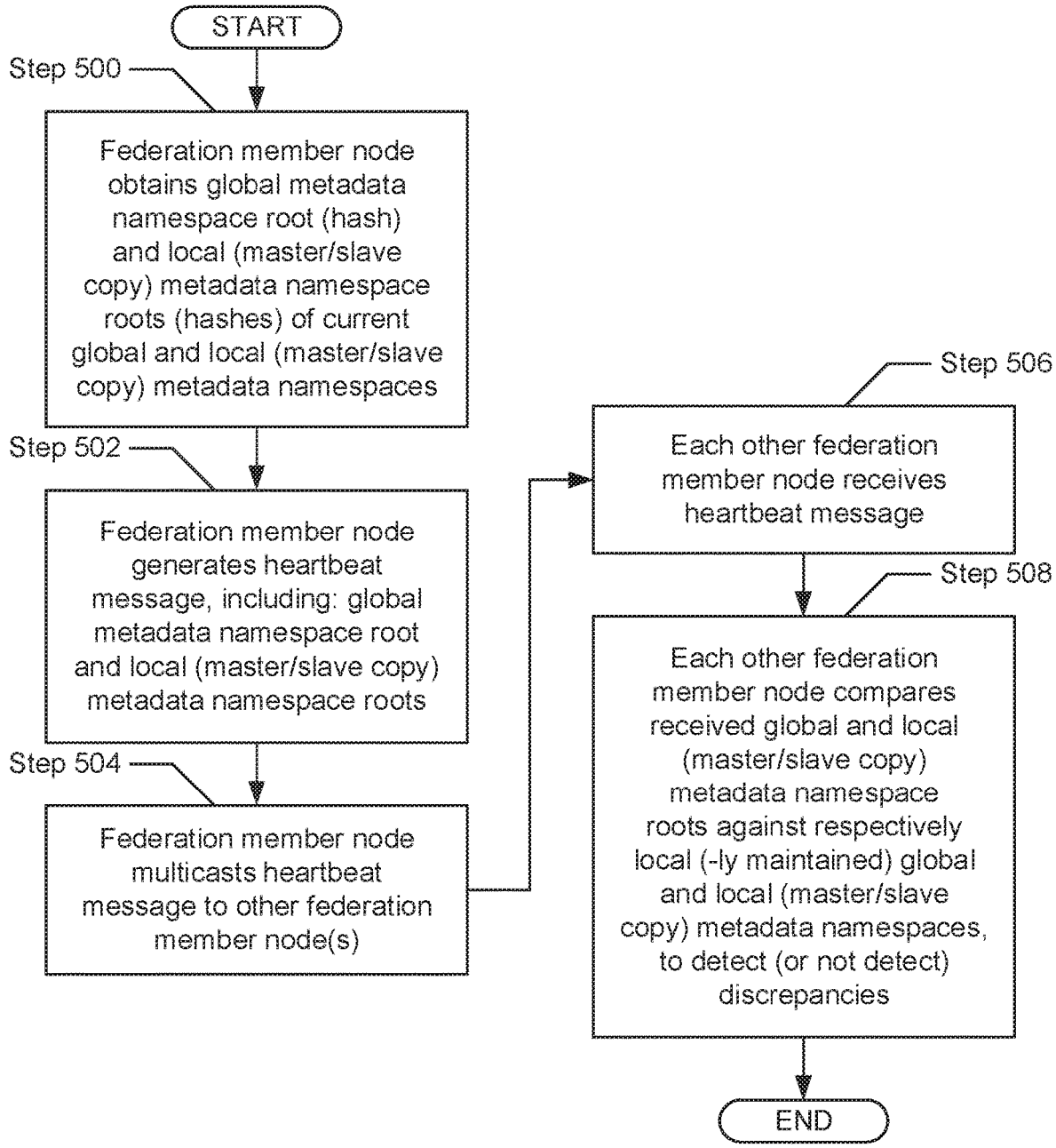
FIG. 5 shows a flowchart describing a federation heartbeat protocol in accordance with one or more embodiments of the invention.

FIG. 5 shows a flowchart describing a federation heartbeat protocol in accordance with one or more embodiments of the invention. The various steps outlined below may be performed by two or more federation member nodes (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 5, in Step 500, a metadata namespace summary is obtained by a federation member node (see e.g., FIGS. 1 and 3). In one embodiment of the invention, the metadata namespace summary may refer to a collection of cryptographic hashes, including: a global metadata namespace root of a global metadata namespace (see e.g., FIG. 4B) maintained on the federation member node; and various local metadata namespace roots of various local metadata namespaces (see e.g., FIG. 4A), respectively, also maintained on the federation member node.

In Step 502, a heartbeat message is generated by the federation member node. In one embodiment of the invention, the heartbeat message may include the metadata namespace summary (obtained in Step 500), as well as information (e.g., a globally unique identifier (GUID)) identifying the federation member node. Thereafter, in Step 504, the heartbeat message (generated in Step 502) is multi-casted, by the federation member node, to the many other (remote) federation member nodes.

In Step 506, the heartbeat message (multi-casted in Step 504) is received by each other (remote) federation member node. Following its receipt, in Step 508, the metadata namespace summary, enclosed in the heartbeat message, is used by each other (remote) federation member node to verify (or otherwise authenticate) the various metadata collections maintained thereon. More specifically, through comparison of the received metadata namespace summary against another metadata namespace summary, generated by the other (remote) federation member node and reflective of the global and various local metadata namespaces thereon, discrepancies between the summaries may or may not be detected. Should the received metadata namespace summary (of the federation member node) and the generated metadata namespace summary (of the other (remote) federation member node) match, then no discrepancies may be detected. On the other hand, should the two metadata namespace summaries mismatch, then discrepancies (manifesting as hash differences between one or more pairs of equivalent metadata namespace roots) may be detected. Further, in the event of a mismatch, the other (remote) federation member node may initiate a metadata namespace pull update protocol (see e.g., FIGS. 7A and 7B) with the federation member node.

Figure 6A:
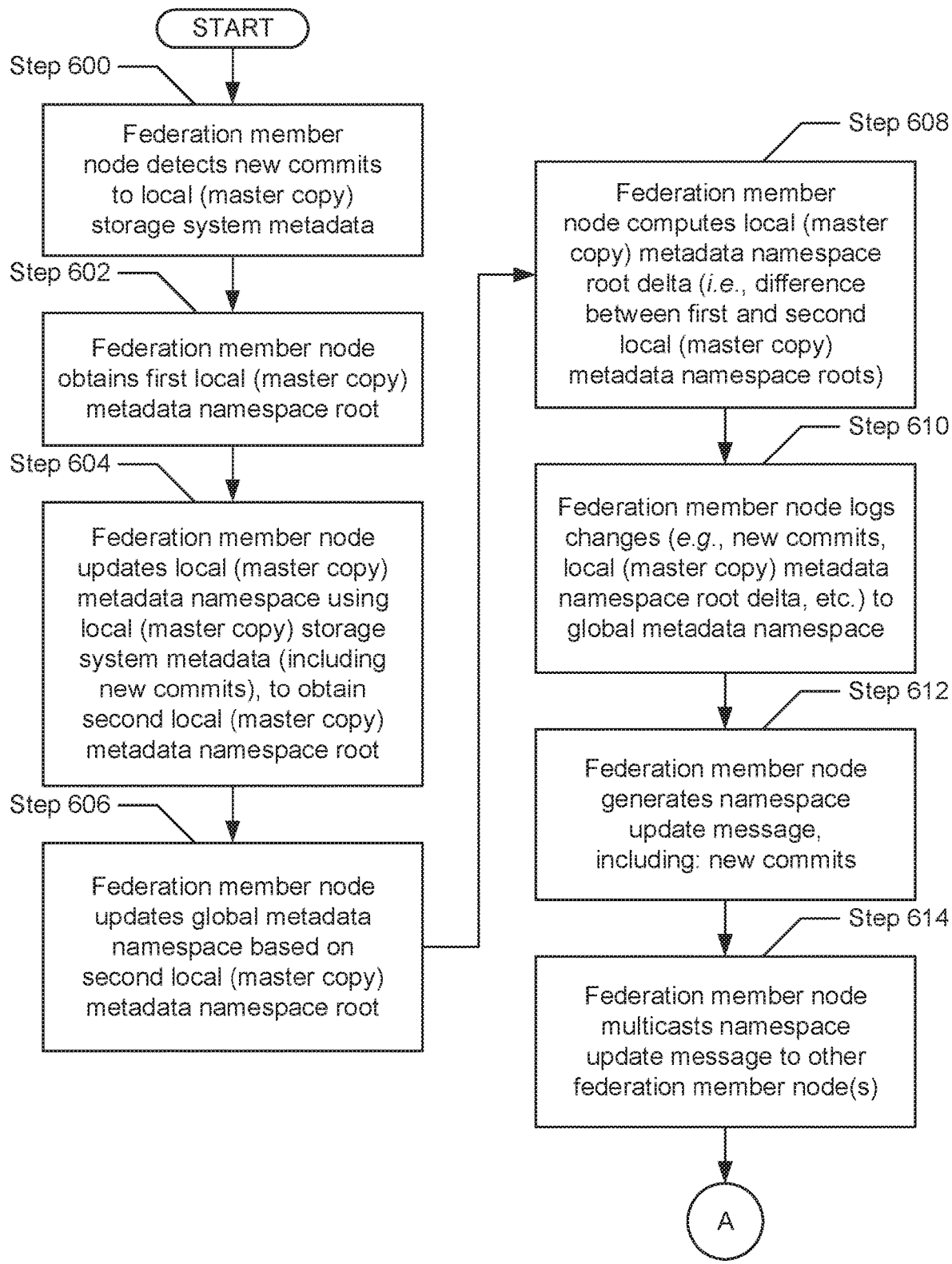
FIGS. 6A and 6B show flowcharts describing a metadata namespace push update protocol in accordance with one or more embodiments of the invention.
Figure 6B:
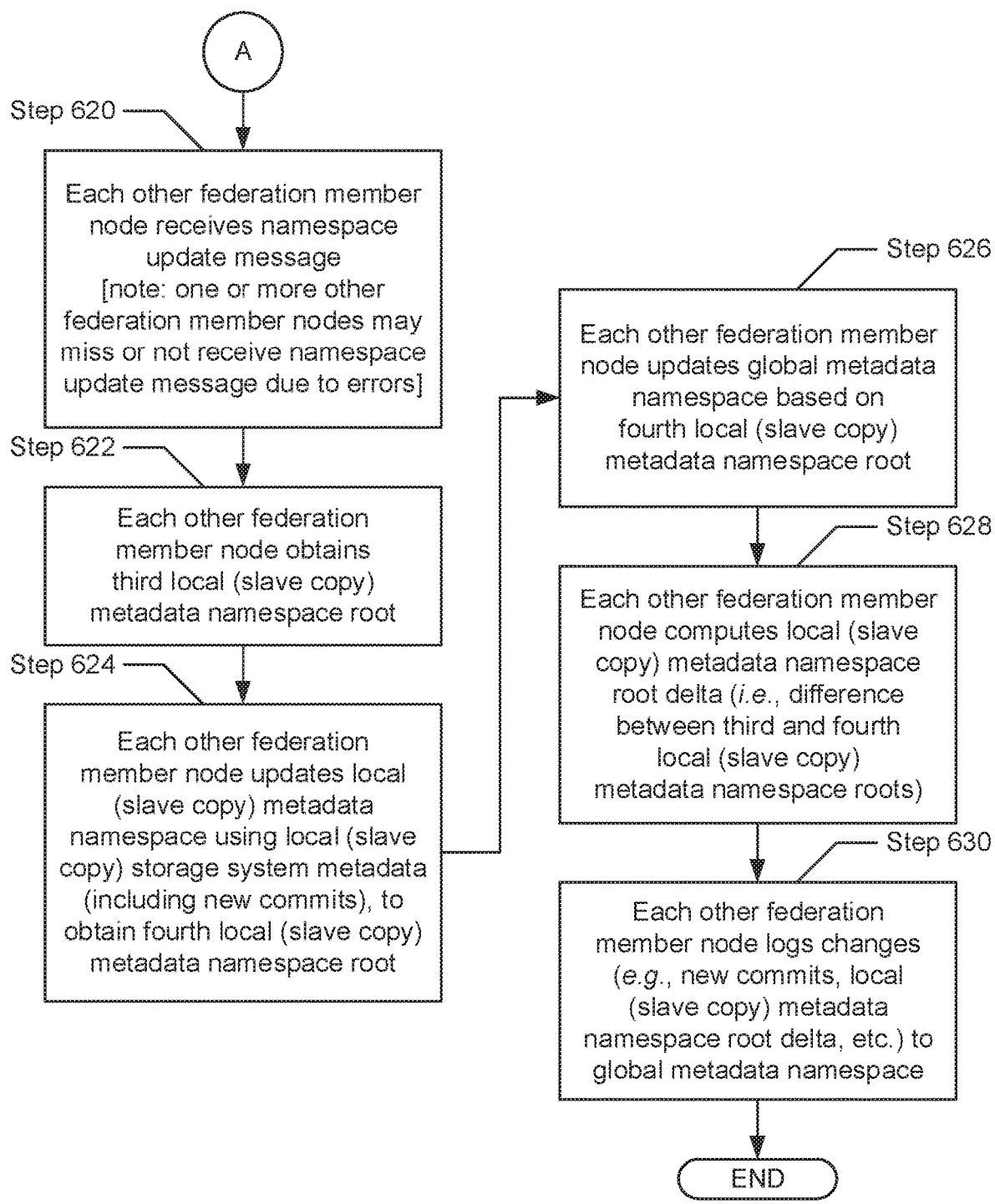

FIGS. 6A and 6B show flowcharts describing a metadata namespace push update protocol in accordance with one or more embodiments of the invention. The various steps outlined below may be performed by two or more federation member nodes (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 6A, in Step 600, one or more new commits is/are detected by a federation member node (see e.g., FIGS. 1 and 3). In one embodiment of the invention, the new commit(s) may represent changes, such as additions, deletions, and/or modifications, which had been recently applied to a master metadata collection (described above) (see e.g., FIG. 3) consolidated on the federation member node.

In Step 602, a first local metadata namespace root is obtained by the federation member node. In one embodiment of the invention, the first local metadata namespace root may represent an aggregated cryptographic hash for all pieces of metadata (excluding the new commit(s) (detected in Step 600)) specified in the above-mentioned master metadata collection.

In Step 604, a local metadata namespace (see e.g., FIG. 4A) is updated by the federation member node. In one embodiment of the invention, the local metadata namespace may be associated with, and thus derived from, the master metadata collection. Updating the local metadata namespace may entail re-deriving the local metadata namespace (into a new local metadata namespace) from the current master metadata collection state (including the new commit(s) (detected in Step 600)). Furthermore, from the new local metadata namespace, a second local metadata namespace root may be obtained by the federation member node. The second local metadata namespace root may represent a topmost node of the new local metadata namespace and, accordingly, may represent an aggregated cryptographic hash for all pieces of metadata (including the new commit(s)) specified in the current master metadata collection.

In Step 606, a global metadata namespace (see e.g., FIG. 4B) is updated by the federation member node. In one embodiment of the invention, the global metadata namespace may be associated with, and thus derived from, all (master and various slave) metadata collections stored on the federation member node. Updating the global metadata namespace may entail re-deriving the global metadata namespace (into a new global metadata namespace) from the various local metadata namespace roots (including the second local metadata namespace root (obtained in Step 604) in place of the first local metadata namespace root (obtained in Step 602)) tracked on the federation member node.

In Step 608, a local metadata namespace root delta is computed by the federation member node. In one embodiment of the invention, the local metadata namespace root delta may reflect a hash difference between the first local metadata namespace root (obtained in Step 602) and the second local metadata namespace root (obtained in Step 604).

In Step 610, the new commit(s) (detected in Step 600) is/are logged by the federation member node. That is, in one embodiment of the invention, a log record may be created in a metadata changes log associated with the master metadata collection. Further, the log record may map the new commit(s) to the local metadata namespace root delta (computed in Step 608). Through this mapping, the federation member node may associate the new commit(s) as responsible for, and may perform future lookups for the new commit(s) using, the local metadata namespace root delta.

In Step 612, a namespace update message is generated by the federation member node. In one embodiment of the invention, the namespace update message may include the new commit(s) (detected in Step 600), as well as information (e.g., a globally unique identifier (GUID)) identifying the federation member node. Thereafter, in Step 614, the namespace update message (generated in Step 612) is multi-casted, by the federation member node, to the many other (remote) federation member nodes.

Turning to FIG. 6B, in Step 620, the namespace update message (multi-casted in Step 614) is received by at least a subset of the many other (remote) federation member nodes. That is, in one embodiment of the invention, all other (remote) federation member nodes may receive the namespace update message. In another embodiment of the invention, one or more other (remote) federation member nodes may not receive the namespace update message due to a variety of reasons or errors (e.g., data packet loss stemming from errors in data transmission or network congestion, network outages, etc.), whereas a remaining subset of the other (remote) federation member nodes will.

In Step 622, a third local metadata namespace root is obtained by each other (remote) federation metadata node, which had received the namespace update message in Step 620. In one embodiment of the invention, the third local metadata namespace root may represent an aggregated cryptographic hash for all pieces of metadata (excluding the new commit(s) (enclosed in the namespace update message received in Step 620)) specified in a slave metadata collection (of the many slave metadata collections) maintained on the other (remote) federation member node. Further, the aforementioned slave metadata collection may represent a slave copy of the above-mentioned master metadata collection stored on the federation member node.

In Step 624, a local metadata namespace (see e.g., FIG. 4A) is updated by each other (remote) federation member node. In one embodiment of the invention, the local metadata namespace may be associated with, and thus derived from, the above-mentioned slave metadata collection on the other (remote) federation member nodes. Updating the local metadata namespace may entail re-deriving the local metadata namespace (into a new local metadata namespace) from the current slave metadata collection state (including the new commit(s) (enclosed in the namespace update message received in Step 620)). Furthermore, from the new local metadata namespace, a fourth local metadata namespace root may be obtained by each other (remote) federation member node. The fourth local metadata namespace root may represent a topmost node of the new local metadata namespace and, accordingly, may represent an aggregated cryptographic hash for all pieces of metadata (including the new commit(s)) specified in the current slave metadata collection on each other (remote) federation member node.

In Step 626, a global metadata namespace (see e.g., FIG. 4B) is updated by each other (remote) federation member node. In one embodiment of the invention, the global metadata namespace may be associated with, and thus derived from, all (master and various slave) metadata collections stored on a respective other (remote) federation member node. Updating the global metadata namespace may entail re-deriving the global metadata namespace (into a new global metadata namespace) from the various local metadata namespace roots (including the fourth local metadata namespace root (obtained in Step 624) in place of the third local metadata namespace root (obtained in Step 622)) tracked on each respective other (remote) federation member node.

In Step 628, a local metadata namespace root delta is computed by the federation member node. In one embodiment of the invention, the local metadata namespace root delta may reflect a hash difference between the third local metadata namespace root (obtained in Step 622) and the fourth local metadata namespace root (obtained in Step 624).

In Step 630, the new commit(s) (enclosed in the namespace update message received in Step 620) is/are logged by each other (remote) federation member node. That is, in one embodiment of the invention, a log record may be created in a metadata changes log associated with the slave metadata collection. Further, the log record may map the new commit(s) to the local metadata namespace root delta (computed in Step 628). Through this mapping, each other (remote) federation member node may associate the new commit(s) as responsible for, and may perform future lookups for the new commit(s) using, the local metadata namespace root delta.

Figure 7A:
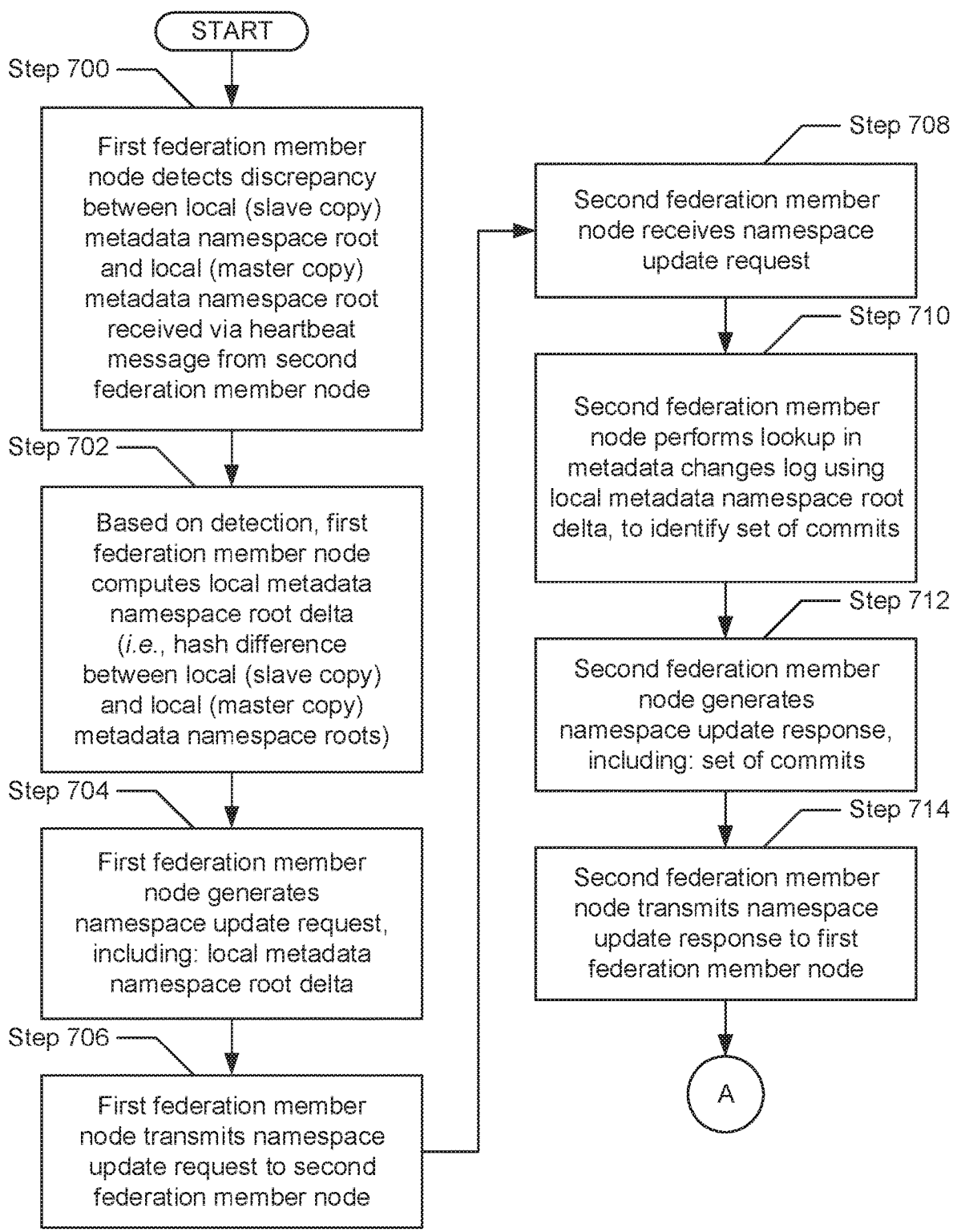
FIGS. 7A and 7B show flowcharts describing a metadata namespace pull update protocol in accordance with one or more embodiments of the invention.
Figure 7B:
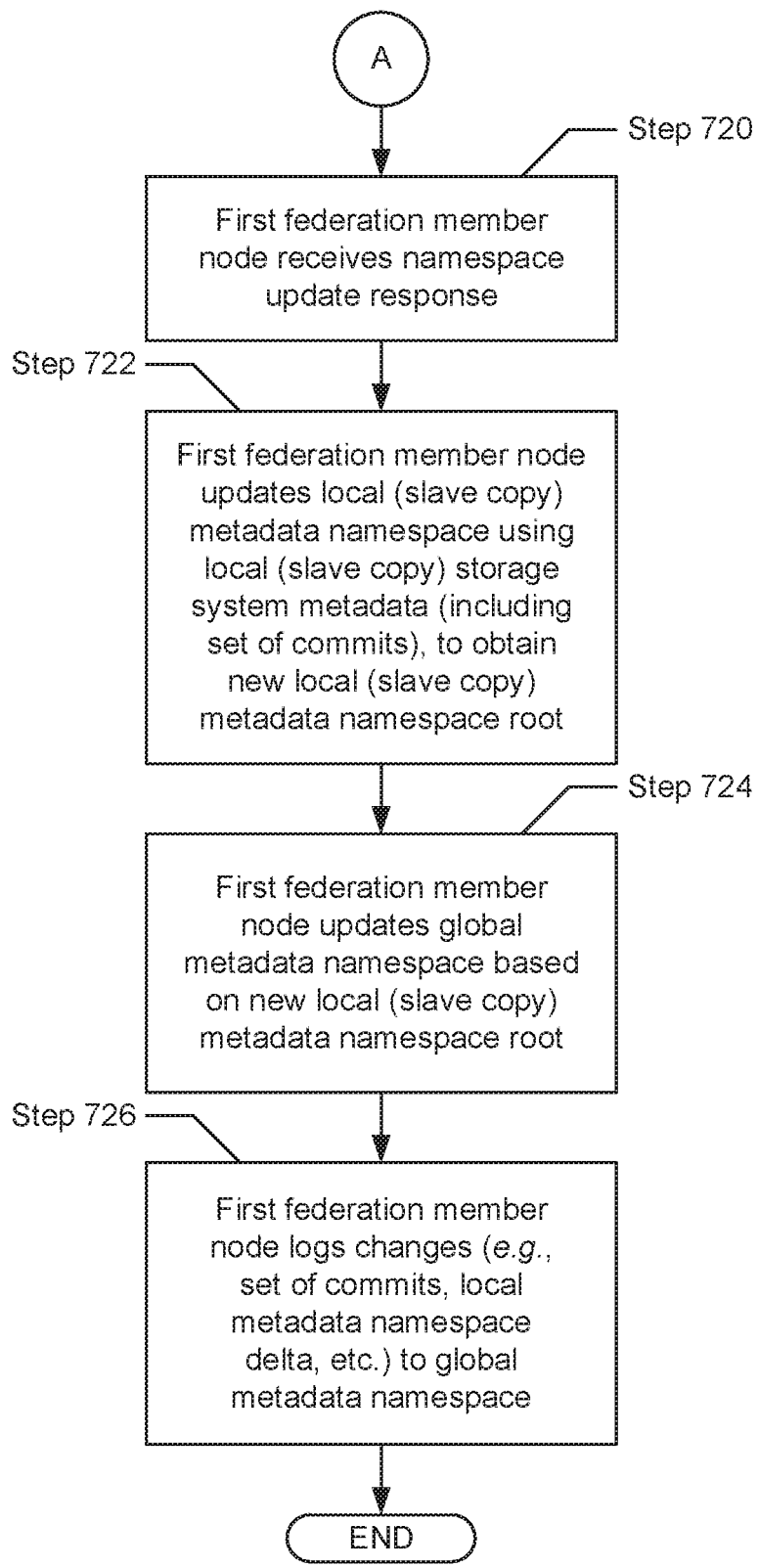

FIGS. 7A and 7B show flowcharts describing a metadata namespace pull update protocol in accordance with one or more embodiments of the invention. The various steps outlined below may be performed by two or more federation member nodes (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 7A, in Step 700, a discrepancy, between first and second local metadata namespace roots (see e.g., FIG. 4A), is detected by a first federation member node. In one embodiment of the invention, the first local metadata namespace root may represent an aggregated cryptographic hash for all pieces of metadata specified in a slave metadata collection (of the many slave metadata collections) maintained on the first federation member node. The second local metadata namespace root may represent an aggregated cryptographic hash for all pieces of metadata specified in a master metadata collection maintained on, which may be received via a heartbeat message (see e.g., FIG. 5) from, a second federation member node. Further, the slave metadata collection (on the first federation member node) may represent a slave copy of the master metadata collection (on the second federation member node). Moreover, the discrepancy may manifest as an observed hash difference between the first and second local metadata namespace roots, which may translate to a mismatch in content between the aforementioned slave and master metadata collections. The content mismatch may, for example, be caused from the missed reception of one or more transpired metadata namespace push updates (in the form of one or more namespace update messages (see e.g., FIGS. 6A and 6B)) from the second federation member node.

In Step 702, a local metadata namespace root delta is computed by the first federation member node. In one embodiment of the invention, the local metadata namespace root delta may reflect the hash difference between the first and second local metadata namespace roots (between which the discrepancy had been detected in Step 700).

In Step 704, a namespace update request is generated by the first federation member node. In one embodiment of the invention, the namespace update request may include the local metadata namespace root delta (computed in Step 702), as well as information (e.g., a globally unique identifier (GUID)) identifying the first federation member node. Thereafter, in Step 706, the namespace update request (generated in Step 704) is transmitted, by the first federation member node, to the second federation member node.

In Step 708, the namespace update request (transmitted in Step 706) is received by the second federation member node. Subsequently, in Step 710, a lookup is performed, by the second federation member node, on a metadata changes log for the above-mentioned master metadata collection stored thereon. Specifically, in one embodiment of the invention, the lookup may use the local metadata namespace root delta (enclosed in the namespace update request) as the search key, and may lead to the identification of one or more log records. Each log record may map one or more commits (representing changes such as additions, deletions, and/or modifications), applied to the master metadata collection, to another local metadata namespace root delta, which may have been computed by the second federation member node at an earlier point-in-time. Through each mapping, the second federation member node may associate the commit(s) of the identified log record as responsible for the other local metadata namespace root delta of the identified log record.

Furthermore, in one embodiment of the invention, the local metadata namespace root delta (enclosed in the namespace update request) may match the other local metadata namespace root of a single identified log record. In such an embodiment, a set of commits formed from the commit(s) of the single identified log record may subsequently be obtained. In another embodiment of the invention, the local metadata namespace root delta (enclosed in the namespace update request) may equal the summation of two or more other local metadata namespace roots of two or more identified log records, respectively. In the latter embodiment, the collective commits of the two or more identified log records may pertain to two or more time-consecutive commit operations applied to the master metadata collection and logged in the metadata changes log thereof. In the latter embodiment, a set of commits formed from the collective commits of the two or more identified log records may subsequently be obtained.

In Step 712, a namespace update response is generated by the second federation member node. In one embodiment of the invention, the namespace update response may include the set of commits (obtained in Step 710), as well as information (e.g., a globally unique identifier (GUID)) identifying the second federation member node. Thereafter, in Step 714, the namespace update response (generated in Step 712) is transmitted, by the second federation member node, to the first federation member node in response to the namespace update request (received in Step 708).

Turning to FIG. 7B, in Step 720, the namespace update response (transmitted in Step 714) is received by the first federation member node. In Step 722, a local metadata namespace (see e.g., FIG. 4A) is updated by the first federation member node. In one embodiment of the invention, the local metadata namespace may be associated with, and thus derived from, the above-mentioned slave metadata collection on the first federation member node. Updating the local metadata namespace may entail re-deriving the local metadata namespace (into a new local metadata namespace) from the current slave metadata collection state (including the set of commits (enclosed in the namespace update response received in Step 720)).

Furthermore, in one embodiment of the invention, from the new local metadata namespace, a third local metadata namespace root may be obtained by the first federation member node. The third local metadata namespace root (which should match the second local metadata namespace root) may represent a topmost node of the new local metadata namespace and, accordingly, may represent an aggregated cryptographic hash for all pieces of metadata (including the set of commits) specified in the current slave metadata collection. That is, the new local metadata namespace may be derived from, following the application of the set of commits to, the slave metadata collection. The current slave metadata collection may correct the discrepancy (detected in Step 700).

In Step 724, a global metadata namespace (see e.g., FIG. 4B) is updated by each the first federation member node. In one embodiment of the invention, the global metadata namespace may be associated with, and thus derived from, all (master and various slave) metadata collections stored on the first federation member node. Updating the global metadata namespace may entail re-deriving the global metadata namespace (into a new global metadata namespace) from the various local metadata namespace roots (including the third local metadata namespace root (obtained in Step 722) in place of the first local metadata namespace root) tracked on the first federation member node.

In Step 726, the set of commits (enclosed in the namespace update response received in Step 720) is logged by the first federation member node. That is, in one embodiment of the invention, a log record may be created in a metadata changes log associated with the slave metadata collection. Further, the log record may map the set of commits to the local metadata namespace root delta (computed in Step 702). Through this mapping, the first federation member node may associate the set of commits as responsible for, and may perform future lookups for the set of commits using, the local metadata name space root delta.

Figure 8:
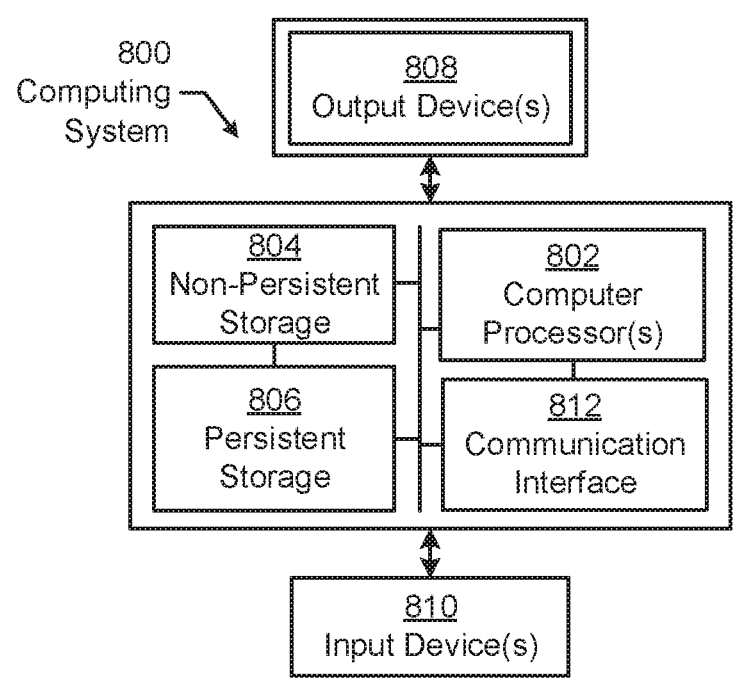
FIG. 8 shows an exemplary computing system in accordance with one or more embodiments of the invention.

FIG. 8 shows an exemplary computing system in accordance with one or more embodiments of the invention. The computing system (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), input devices (810), output devices (808), and numerous other elements (not shown) and functionalities. Each of these components is described below.

In one embodiment of the invention, the computer processor(s) (802) may be an integrated circuit for processing instructions. For example, the computer processor(s) may be one or more cores or micro-cores of a processor. The computing system (800) may also include one or more input devices (810), such as a touchscreen, keyboard, mouse, microphone, touchpad, electronic pen, or any other type of input device. Further, the communication interface (812) may include an integrated circuit for connecting the computing system (800) to a network (not shown) (e.g., a local area network (LAN), a wide area network (WAN) such as the Internet, mobile network, or any other type of network) and/or to another device, such as another computing device.

In one embodiment of the invention, the computing system (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for synchronizing metadata across a plurality of federation member nodes, comprising:
   detecting, by a first federation member node of the plurality of federation member nodes, a discrepancy between a slave metadata collection maintained on the first federation member node and a master metadata collection maintained on a second federation member node of the plurality of federation member nodes;
   computing, by the first federation member node and in response to detecting the discrepancy, a local metadata namespace root delta comprising a hash difference between first and second aggregated cryptographic hashes;
   mapping a set of commits applied to the master metadata collection to the local metadata namespace root delta based on the first and second aggregated cryptographic hashes, wherein the set of commits are searchable using the local metadata namespace root delta based on the mapping;
   transmitting, by the first federation member node and to the second federation member node, a namespace update request comprising the local metadata namespace root delta and the set of commits;
   receiving, by the first federation member node, from the second federation member node, and in response to the namespace update request, the set of commits applied to the master metadata collection,
      wherein the set of commits represents the discrepancy between the slave and master metadata collections; and
   applying, by the first federation member node and to correct the discrepancy, the set of commits to the slave metadata collection, and wherein the set of commits remains searchable using the local metadata namespace root delta after applying.

2. The method of claim 1, wherein the first aggregated cryptographic hash is reflective of a first local metadata namespace root of a first local metadata namespace maintained on the first federation member node and the second aggregated cryptographic hash is reflective of a second local metadata namespace root of a second local metadata namespace maintained on the second federation member node.

3. The method of claim 2, wherein the first local metadata namespace represents a first hash-based data structure used to verify the slave metadata collection, wherein the second local metadata namespace represents a second hash-based data structure used to verify the master metadata collection.

4. The method of claim 1, further comprising:
   prior to detecting the discrepancy by the first federation member node:
      receiving, by the first federation member node and from the second federation member node, a heartbeat message comprising a first metadata namespace summary for a first global metadata namespace maintained on the second federation member node;
      obtaining, by the first federation member node, a second metadata namespace summary for a second global metadata namespace maintained on the first federation member node; and
      comparing, by the first federation member node, the first and second metadata namespace summaries,
      wherein a mismatch between, based on comparing, the first and second metadata namespace summaries leads to detecting the discrepancy.

5. The method of claim 4, wherein the first global metadata namespace represents a first hash-based data structure used to verify all metadata currently maintained on the second federation member node, wherein the second global metadata namespace represents a second hash-based data structure used to verify all metadata currently maintained on the first federation member node.

6. The method of claim 5, wherein the first metadata namespace summary comprises a first global metadata namespace root of the first global metadata namespace and a plurality of first local metadata namespace roots of a first plurality of local metadata namespaces for a first plurality of metadata collections maintained on the second federation member node.

7. The method of claim 6, wherein the second metadata namespace summary comprises a second global metadata namespace root of the second global metadata namespace and a plurality of second local metadata namespace roots of a second plurality of local metadata namespaces for a second plurality of metadata collections maintained on the first federation member node.

8. The method of claim 4, further comprising:
   prior to receiving the heartbeat message by the first federation member node:
      detecting, by the second federation member node, the set of commits applied to the master metadata collection maintained thereon; and multicasting, by the second federation member node and to a remainder of the plurality of federation member nodes comprising the first federation member node, a namespace update message comprising the set of commits, wherein the first federation member node fails to receive the namespace update message.

9. The method of claim 8, further comprising:

prior to multicasting the namespace update message by the second federation member node:

obtaining, by the second federation member node, a current local metadata namespace root of a current local metadata namespace maintained on the second federation member node for the master metadata collection;

updating, by the second federation member node and to include the set of commits, the current metadata namespace to obtain a new current metadata namespace;

obtaining, by the second federation member node, a new current local metadata namespace root of the new current metadata namespace; and computing, by the second federation member node, the local metadata namespace root delta using the current and new current local metadata namespace roots.

10. A non-transitory computer readable medium (CRM) comprising computer readable program code, which when executed by a first computer processor of a first federation member node, enables the first computer processor to:

detect a discrepancy between a slave metadata collection maintained on the first federation member node and a master metadata collection maintained on a second federation member node;

compute, in response to detecting the discrepancy, a local metadata namespace root delta comprising a hash difference between first and second aggregated cryptographic hashes;

map a set of commits applied to the master metadata collection to the local metadata namespace root delta based on the first and second aggregated cryptographic hashes, wherein the set of commits are searchable using the local metadata namespace root delta based on the mapping;

transmit, to the second federation member node, a namespace update request comprising the local metadata namespace root delta and the set of commits;

receive, from the second federation member node and in response to the namespace update request, the set of commits applied to the master metadata collection, wherein the set of commits represents the discrepancy between the slave and master metadata collections; and apply, to correct the discrepancy, the set of commits to the slave metadata collection, and wherein the set of commits remains searchable using the local metadata namespace root delta after applying.

11. The non-transitory CRM of claim 10, wherein the first aggregated cryptographic hash is reflective of a first local metadata namespace root of a first local metadata namespace maintained on the first federation member node and the second aggregated cryptographic hash is reflective of a second local metadata namespace root of a second local metadata namespace maintained on the second federation member node.

12. The non-transitory CRM of claim 11, wherein the first local metadata namespace represents a first hash-based data structure used to verify the slave metadata collection, wherein the second local metadata namespace represents a second hash-based data structure used to verify the master metadata collection.

13. The non-transitory CRM of claim 10, comprising computer readable program code, which when executed by the first computer processor of the first federation member node, further enables the first computer processor to:

prior to detecting the discrepancy:

receive, from the second federation member node, a heartbeat message comprising a first metadata namespace summary for a first global metadata namespace maintained on the second federation member node;

obtain a second metadata namespace summary for a second global metadata namespace maintained on the first federation member node; and compare the first and second metadata namespace summaries, wherein a mismatch between, based on comparing, the first and second metadata namespace summaries leads to detecting the discrepancy.

14. The non-transitory CRM of claim 13, wherein the first global metadata namespace represents a first hash-based data structure used to verify all metadata currently maintained on the second federation member node, wherein the second global metadata namespace represents a second hash-based data structure used to verify all metadata currently maintained on the first federation member node.

15. The non-transitory CRM of claim 14, wherein the first metadata namespace summary comprises a first global metadata namespace root of the first global metadata namespace and a plurality of first local metadata namespace roots of a first plurality of local metadata namespaces for a first plurality of metadata collections maintained on the second federation member node.

16. The non-transitory CRM of claim 15, wherein the second metadata namespace summary comprises a second global metadata namespace root of the second global metadata namespace and a plurality of second local metadata namespace roots of a second plurality of local metadata namespaces for a second plurality of metadata collections maintained on the first federation member node.

17. The non-transitory CRM of claim 13, comprising computer readable program code, which when executed by a second computer processor of the second federation member node, enables the second computer processor to:

prior to the first computer processor receiving the heartbeat message:

detect the set of commits applied to the master metadata collection maintained on the second federation member node; and multicast to a remainder of the plurality of federation member nodes comprising the first federation member node, a namespace update message comprising the set of commits, wherein the first computer processor of the first federation member node fails to receive the namespace update message.

18. The non-transitory CRM of claim 17, comprising computer readable program code, which when executed by the second computer processor of the second federation member node, further enables the second computer processor to:
prior to multicasting the namespace update message:
obtain a current local metadata namespace root of a current local metadata namespace maintained on the second federation member node for the master metadata collection;
update, to include the set of commits, the current metadata namespace to obtain a new current metadata namespace;
obtain a new current local metadata namespace root of the new current metadata namespace; and
compute the local metadata namespace root delta using the current and new current local metadata namespace roots.

19. A system, comprising:
a plurality of federation member nodes comprising a first federation member node and a second federation member node,
wherein the first federation member node comprises a computer processor configured to:
detect a discrepancy between a slave metadata collection maintained on the first federation member node and a master metadata collection maintained on the second federation member node;
compute, in response to detecting the discrepancy, a local metadata namespace root delta comprising a hash difference between first and second aggregated cryptographic hashes;
map a set of commits applied to the master metadata collection to the local metadata namespace root delta based on the first and second aggregated cryptographic hashes, wherein the set of commits are searchable using the local metadata namespace root delta based on the mapping;
transmit, to the second federation member node, a namespace update request comprising the local metadata namespace root delta and the set of commits;
receive, from the second federation member node and in response to the namespace update request, the set of commits applied to the master metadata collection,
wherein the set of commits represents the discrepancy between the slave and master metadata collections; and
apply, to correct the discrepancy, the set of commits to the slave metadata collection, and wherein the set of commits remains searchable using the local metadata namespace root delta after applying.

20. The system of claim 19, wherein the plurality of federation member nodes forms a geo-distributed, decentralized peer-to-peer network.

* * * * *